(12) United States Patent
Jin

(10) Patent No.: US 9,618,969 B2
(45) Date of Patent: Apr. 11, 2017

(54) ELECTRONIC DEVICE

(71) Applicants: Beijing Lenovo Software Ltd., Beijing (CN); Lenovo (Beijing) Limited, Beijing (CN)

(72) Inventor: Lingsong Jin, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 0 days.

(21) Appl. No.: 14/747,607

(22) Filed: Jun. 23, 2015

(65) Prior Publication Data

US 2016/0274620 A1 Sep. 22, 2016

(30) Foreign Application Priority Data

Mar. 17, 2015 (CN) .......................... 2015 1 0117661

(51) Int. Cl.
*G06F 1/16* (2006.01)
*A44C 5/00* (2006.01)

(52) U.S. Cl.
CPC .......... *G06F 1/163* (2013.01); *A44C 5/0015* (2013.01); *G06F 1/1649* (2013.01)

(58) Field of Classification Search
CPC ...... G06F 1/1613; G06F 1/163; G06F 1/1633; G06F 1/1637; G06F 1/1639; G06F 1/1647; G06F 1/1649; G06F 1/165
See application file for complete search history.

(56) References Cited

U.S. PATENT DOCUMENTS

| | | | | |
|---|---|---|---|---|
| 9,122,249 | B2* | 9/2015 | Lyons | G04G 17/083 |
| 9,176,530 | B2* | 11/2015 | Rothkopf | G06F 1/163 |
| 2005/0057726 | A1* | 3/2005 | Uehara | G02B 27/1046 |
| | | | | 353/30 |
| 2008/0079916 | A1* | 4/2008 | Noba | H04N 5/74 |
| | | | | 353/119 |
| 2011/0194057 | A1* | 8/2011 | Haruyama | G02F 1/133634 |
| | | | | 349/117 |
| 2011/0267316 | A1* | 11/2011 | Kim | G06F 1/1639 |
| | | | | 345/175 |
| 2012/0316456 | A1* | 12/2012 | Rahman | G06F 1/163 |
| | | | | 600/547 |
| 2013/0278800 | A1* | 10/2013 | Liu | H04N 5/23296 |
| | | | | 348/240.1 |
| 2015/0029644 | A1* | 1/2015 | Alcazar | G06F 1/163 |
| | | | | 361/679.01 |
| 2015/0261254 | A1* | 9/2015 | Hiroki | G06F 1/163 |
| | | | | 361/679.03 |
| 2015/0309535 | A1* | 10/2015 | Connor | G06F 1/1637 |
| | | | | 361/679.03 |
| 2016/0041680 | A1* | 2/2016 | Chi | H04B 1/385 |
| | | | | 345/173 |

* cited by examiner

*Primary Examiner* — Christopher L Augustin
(74) *Attorney, Agent, or Firm* — Schwegman Lundberg & Woessner, P.A.

(57) ABSTRACT

An embodiment provides an electronic device, and the electronic device includes: a body having a first end and forming a non-closed ring shape; a first display assembly arranged in the body and having a first display output face being exposed through the first end of the body. The body may further include a second end, wherein the first end and the second end of the body meet a first predetermined position relation in which the first end faces the second end, or in which the first end crosses the second end, or in which the first end is substantially perpendicular to the second end.

8 Claims, 2 Drawing Sheets

ELECTRONIC DEVICE

PRIORITY APPLICATION

This application claims the benefit under 35 U.S.C. 119 to Chinese Application No. 201510117661.7, filed on 17 Mar. 2015; which application is incorporated herein by reference in its entirety.

FIELD

The present disclosure generally relates to information process technology, in particular to an electronic device.

BACKGROUND

At present, a display screen or indicator light of intelligent wristband electronic device is provided in a main body of the intelligent wristband electronic device, and the display output regions of the display screen or indicator light is exposed through the main body, but it increases a thickness of the intelligent wristband electronic device. Additionally, when user views the display screen and indicator light, user must turn over the wrist, it causes the convenience for using the device worse.

SUMMARY

Embodiments of the present disclosure are provided as follows:

An electronic device, includes: a body having a first end and forming a non-closed ring shape; a first display assembly arranged in the body and having a display output face being exposed through the first end of the body.

Preferably, the body further includes: a second end, wherein the first end and the second end of the body meet a first predetermined position relation in which the first end faces the second end, or in which the first end crosses the second end, or in which the first end is substantially perpendicular to the second end.

DETAILED DESCRIPTION OF THE EMBODIMENTS

Embodiments of the present disclosure will be described hereinafter in more detail with reference to figures of the attached drawings and examples.

Figure 1:
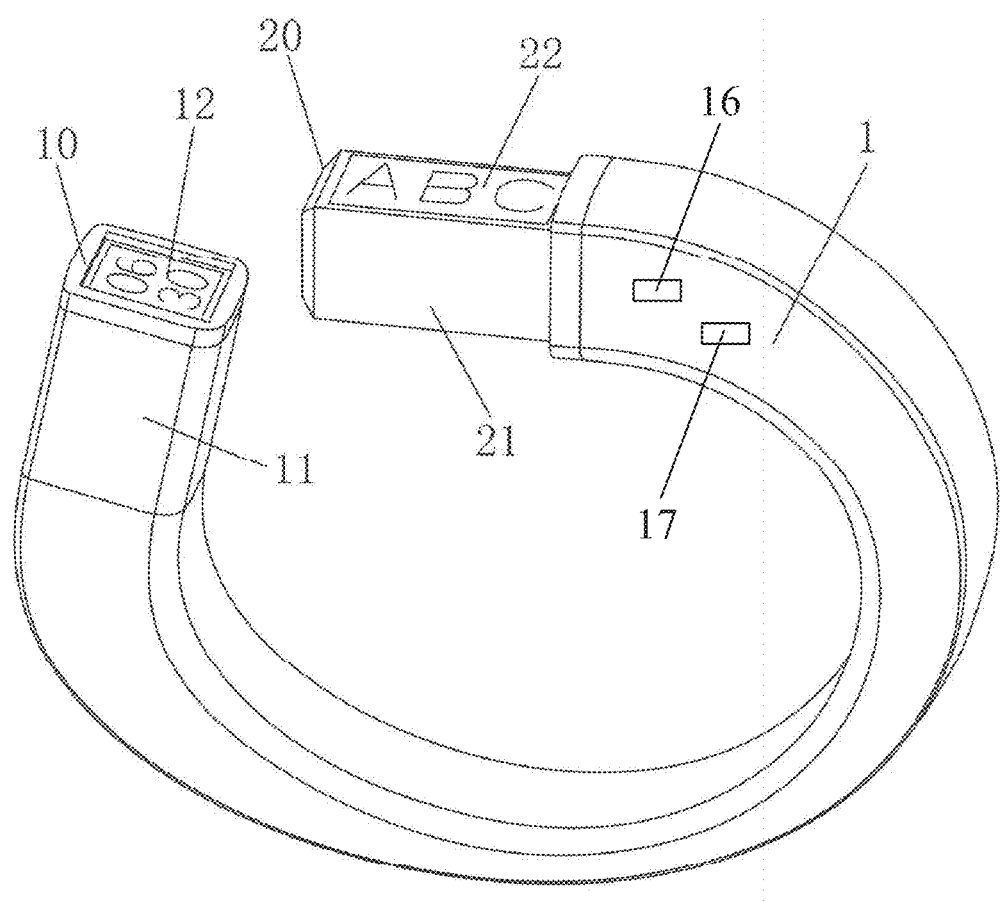
FIG. 1 is a schematic view showing an arrangement of an electronic device according to an embodiment of the present disclosure.

FIG. 1 is a schematic view showing an arrangement of an electronic device according to an embodiment of the present disclosure. As illustrated in FIG. 1, the electronic device according to the embodiment of the present disclosure includes:

a body 1 having a first end 10 and forming a non-closed ring shape;

a first display assembly 11 arranged in the body 1 and having a display output face 12 being exposed through the first end 10 of the body 1.

In the embodiment of the present disclosure, the first display assembly may be such as a CRT display assembly, or a LED display assembly, or a projection display assembly. Most of the first display assembly is clapped by the body 1, leaving only the display output face 12 of the first display assembly 11 exposed at the first end 10.

As illustrated in FIG. 1, the body 1 according to the embodiment of the present disclosure further includes:

a second end 20, wherein the first end 10 and the second end 20 of the body 1 meet a first predetermined position relation.

In an embodiment of the present disclosure, the first predetermined position relation is the position relation in which the first end 10 faces the second end 20, or the first predetermined position relation is the position relation in which the first end 10 crosses the second end 20, or the first predetermined position relation is the position relation in which the first end 10 is substantially perpendicular to the second end 20.

In the embodiment of the present disclosure, the end face of the first end 10 of the body 1 and the end face of the second end 20 of the body 1 may be arranged to face towards each other as shown in FIG. 1, or may be arranged to face toward the same side, that is, one end is twisted to make it have the same orientation as that of the other end.

In an example, the end face of the first end 10 of the body 1 and the end face of the second end 20 of the body 1 may be arranged to face towards each other in offset with each other as shown in FIG. 1, or may be arranged to face towards each other without offset.

As illustrated in FIG. 1, the end face of the first end 10 of the body 1 and the end face of the second end 20 of the body 1 may be arranged to face towards each other and perpendicular to each other.

In an embodiment of the present disclosure, the end face of the first end 10 and the end face of the second end 20 are cut sections (may be any shape) of the body 1. That is, the body 1 may initially be an entire ring shape. The body 1 is cut correspondingly to form the end face of the first end 10 and the end face of the second end 20. In accordance with the cutting modes and requirements, the cut sections of the body 1 may have any shape.

In a prefer embodiment, the end face of the first end 10 and the end face of the second end 20 are the cross sections of the body 1, as illustrated in FIG. 1.

As shown in FIG. 1, the electronic device according to an embodiment of the present disclosure further includes:

a second display assembly 21 which is arranged in the body 1 and has a display output face 22 being exposed through the second end 20 of the body.

As illustrated in FIG. 1, the electronic device according to the embodiment of present disclosure has a shape of ring in entirety. The electronic device according to the embodiment of the present disclosure may be worn on a wrist of the user for the electronic device, or held by the user for the electronic device. Thus, the electronic device according to the embodiment of present disclosure has a shape of ring in entirety with central space therein. The central space of the ring is matched with the shape of the wrist of the user so as to facilitate the user to wear the electronic device on his wrist.

The electronic device according to the embodiment of the present disclosure may be made from flexible material. After the body 1 is applied by an external force, the body 1 may have suitable deformation. When the external force is removed, the body 1 may keep the deformed shape. In this way, the user may wear the electronic device more conveniently.

In the embodiment of the present disclosure, the display output face 12 of the first display assembly 11 and the display output face 22 of the second display assembly 21 meet a second predetermined position relation. The second predetermined position relation may be the position relation in which the display output face 12 of the first display assembly 11 faces the display output face 22 of the second display assembly 21, or may be the position relation in which the display output face 12 of the first display assembly 11 crosses the display output face 22 of the second display assembly 21, or may be the position relation in which the display output face 12 of the first display assembly 11 is substantially parallel to the display output face 22 of the second display assembly 21.

In the embodiment of the present disclosure, as the first end 10 and the second end of the electronic device are provided with the first display assembly 11 and the second display assembly 21 respectively. During using the electronic device, the user needs to view the display output face 12 of the first display assembly 11 and the display output face 22 of the second display assembly 21 conveniently. Thus, it needs to be considered how the display output face 12 and the display output face 22 are presented just in eyes of the user after the electronic device is worn on the user, so as to allow the user to view the display output face 12 and the display output face 22 conveniently.

Accordingly, as shown in FIG. 1, the display output face 12 is arranged at the end face of the first end and the orientation of the display output face 12 may be changed by changing the shape and the orientation of the first end while the display output face 22 is arranged on one lateral side of the second end 20. The display output face 22 may be arranged on one lateral side facing upwardly to allow the user to view the display output face 22 more conveniently.

In the embodiment of the present disclosure, the second display assembly 21 may be such as a projection display assembly, or a CRT display assembly, or a LED display assembly. It should be noted that the first display assembly 11 and the second display assembly 21 have different display principles.

Figure 2:
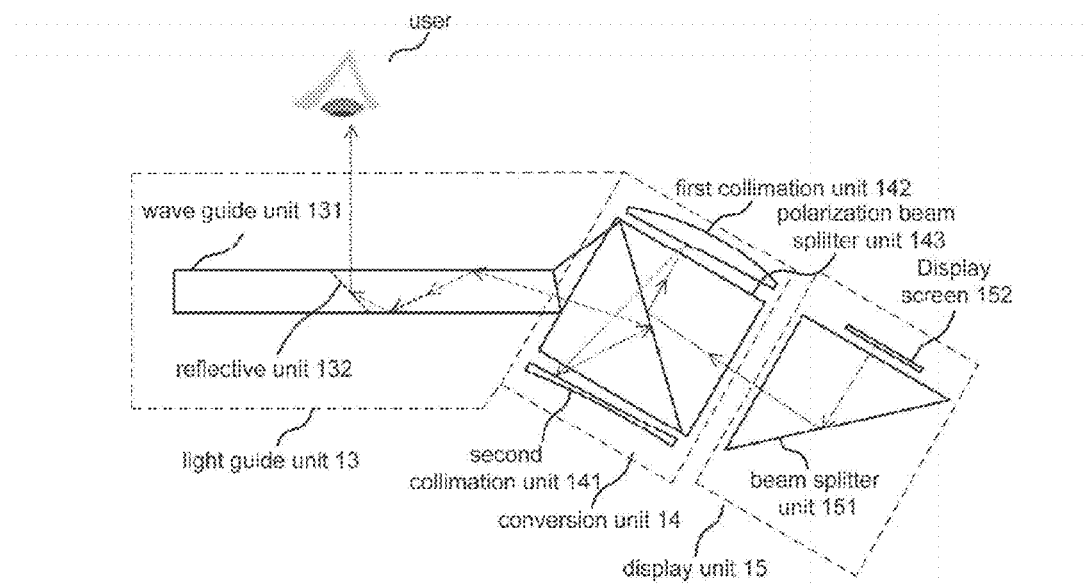
FIG. 2 is a schematic view showing a principle structure of a second display assembly according to an embodiment of the present disclosure.

As shown in FIG. 2, in an embodiment of the present disclosure, as an example, the second display assembly 21 is an optical projection system, and the second display assembly 21 includes:

a display unit 15 configured to display and output displayed contents in form of beam by projecting a first beam;

a conversion unit 14 configured to process the first beam projected and outputted in form of beam to convert it into a second beam and output the second beam;

a guide unit 13 made from transparent material and configured to guide the second beam in the transparent material.

The guide unit 13 is exposed through the second end 20 and has a first surface including the second display output face.

The arrangement and display principle of the second display assembly 21 according to the embodiment of the present disclosure will be explained below in details.

As shown in FIG. 2, the second display assembly 21 includes a beam splitter unit 151 and a display screen 152. The conversion unit 14 includes a second collimation unit 141, a first collimation unit 142 and a polarization beam splitter unit 143. The light guide unit 130 includes a wave guide unit 131 and a reflective unit 132. The conversion unit 14 processes the first beam projected and outputted in form of beam to convert it into the second beam and output the second beam to the light guide unit.

In an example, the conversion unit 14 includes a first collimation unit 142 and a second collimation unit 141 opposed to each other and the polarization beam splitter unit 143 arranged between the first collimation unit 142 and the second collimation unit 141. The first beam outputted from the display unit is initially reflected to the first collimation unit 142 via the polarization beam splitter unit 143, and then collimated by the first collimation unit 142 and the second collimation unit 141 and passes through the polarization beam splitter unit 143 to outgo as the second beam.

Herein, the first collimation unit 142 and the second collimation unit 141 may be single lens or a set of lenses designed as required.

The light guide unit 13 is configured to guide the second beam in the material constituting the light guide unit and finally outputted to an observer. The light guide unit 13 further includes a wave guide unit 131 and a reflective unit 132.

The second beam may be controlled to be directed to a certain position by adjusting the position and angle of the reflective unit 132. In a first case, the conversion unit 14 and the display unit 15 are located on a first side of the plane in which the wave guide unit 131 is located. When the reflective unit 132 as shown in FIG. 2 is provided, the second beam may be directed towards a second side with respect to the plane in which the wave guide unit 131 is located. The first side and the second side are opposed sides with respect to the plane in which the wave guide unit 131 is located.

In an example, when the second display assembly 21 is applied in an intelligent watch, the above exemplary arrangement may be used such that the second beam is directed towards the second side, that is, the second beam is directed to the eyes of the user wearing and viewing the electronic device. Further, the outgoing direction of the second display assembly may be configured as the view requirement, for example, the outgoing direction of the reflective unit 132 may be controlled by controlling the rotation of the reflective unit 132 to achieve switch of double sided display of the second display assembly. In an embodiment of the present disclosure, the reflective unit 132 may be single lens or a set of lenses designed as required.

Figure 3:
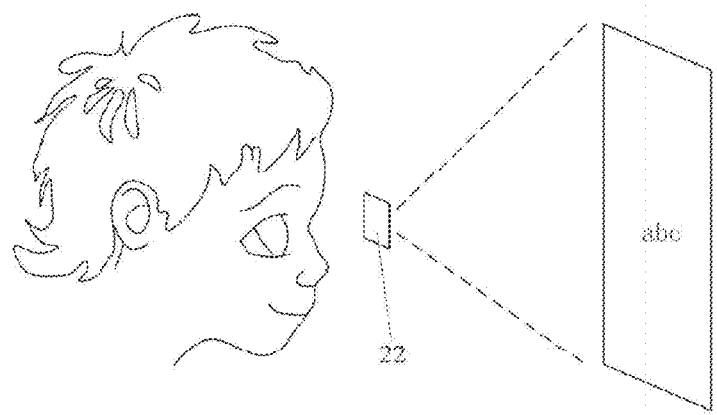
FIG. 3 is a schematic view showing a display principle of a second display assembly according to an embodiment of the present disclosure.

As illustrated in FIG. 3, if the display content on the display screen 152 is "abc", the user will see the content which is identical to the display content on the display screen 152, i.e., "abc" when viewing through the display output face 22, by adjusting the placing position and angle of the associated elements in the second display assembly 21. As the display content on the display screen 152 in the embodiment of the present disclosure is projected by a projection path shown in FIG. 2, the user may view the enlarged display picture.

As shown in FIG. 2, the guide unit 13 further includes a reflective unit 132.

The reflective unit 132 is arranged at a position corresponding to the display output face of the second display assembly in the guide unit, is configured to change the direction in which the second beam is guided in the transparent material to project the second beam towards the display output face of the second display assembly.

In an embodiment of the present disclosure, the first end has a first portion which extends a predetermined distance along the body and is perpendicular to a horizontal plane.

In the embodiment of the present disclosure, in order to allow the user to view the display output face 12 at the first end 10, the first portion of the first end 10 may extend a predetermined distance along the body 1 and is perpendicular to a horizontal plane, that is, keep the first end 10 as vertically as possible. In this way, the user may view the display output face 12 more conveniently.

In an embodiment of the present disclosure, the body 1 is provided with a processor 16 therein, the processor 16 being configured to control the first display assembly 11 to display first display content continuously.

In the embodiment of the present disclosure, the first display content may be any content. As an example, the first display content may be time information, for example, may be a display clock. Once the user views the display output face 12 of the first display assembly 11, he will know the current time. The first display content may also be a reminding date, for example, the user may set a certain commemoration day as the first display content. Once the user views the display output face 12 of the first display assembly 11, he will be reminded for coming of the commemoration day.

In an embodiment of the present disclosure, the body 1 is further provided with a sensing unit 17 configured to receive a triggering operation.

The processor 16 is further configured to analyze the triggering operation received by the sensing unit 17, and to perform a first instruction to control the second display assembly to display second display content when the triggering operation is analyzed to be associated with the first instruction.

In the embodiment of the present disclosure, the sensing unit 17 is provided in the electronic device to analyze the instructions associated with the input of the user. For example, the electronic device may be provided with a vibration sensor therein. When the sensor detects the user to rock the electronic device, the current rocking will be analyzed to switch on the display screen of the second display assembly, that is, make the display screen in ON state. In this way, the user may view the display content on the display screen though the display output face of the second display assembly.

As illustrated in FIG. 3, the beam emitted from the second display assembly is incident into eyes of the user, when the eyes of the user become close to the second display output face of the second display assembly and view it, such that the user perceives a perceived picture. The perceived picture has display content which is the second display content, and the perceived picture has a size greater than that of the second display output face.

In the embodiment of the present disclosure, by magnifying the second display content on the display screen of the second display assembly in the projection path, the user may view the second display content on the display screen of the second display assembly clearly.

In several embodiments in the present application, it should be understood that the disclosed device and method may be implemented by other means. The above embodiments of device are only exemplified, for example, the division of the units may be only a division of logical functions. In an example, other divisions may be applicable. For example, a plurality of units or assemblies may be combined with each other, or may be integrated into another system, or some features may be omitted or may not be executed. In addition, coupling, or direct coupling or communication connection among respective integrate parts displayed or discussed may be indirectly coupling or communication connection by means of some interfaces, devices or units. It may be electrical, mechanical or in other forms.

The above units described as separate components may or may not be separated physically from each other. The components as display units may or may not be physical units. That is, it may be located in one location, or may be distributed on a plurality of network units. It may select part or all of the units as required to achieve the technical solutions of the embodiments.

Further, the respective functional units in the respective embodiments of the present disclosure may be integrated all together in one process unit, or the respective units may be regarded as separate units respectively. Or two or more units may be integrated in single unit. The above integrated unit not only may be implemented in form of hardware, but also may be implemented in form of combination of hardware and software functional units.

The skilled person in the art would appreciate that all or part of steps in the above process embodiments may be implemented by hardware associated with program instructions. The program may be stored in a computer readable storage medium. When the program is executed, the steps in the above process embodiments are performed. The storage medium includes: all of kinds of media that may storage program codes, such as mobile storage device, read-only memory (ROM), random access memory (RAM), magnetic discs or optical discs.

Or, if the above integrated units in the embodiments are implemented in form of software functional module and sold or used as a separate product, the units may be stored in a computer readable storage medium. Based on the above understanding, the technical solutions of the embodiment of the present disclosure in essential or the part which makes over the prior art may be implemented in form of software products. The software products may be stored in a storage medium which includes some instructions to make a computing device (may be such as a personal computer, a server or a network device) execute all of part of the respective process embodiments of the present disclosure. The storage medium includes: all of kinds of media that may storage program codes, such as mobile storage device, read-only memory (ROM), random access memory (RAM), magnetic discs or optical discs.

The above embodiments are only those of the present disclosure by way of examples instead of limiting the present disclosure. Any modifications or replacements that can be envisaged easily by the skilled person in the art from the present disclosure, should fall within the protect scope of the present disclosure. Therefore, the protect scope of the present disclosure should be defined by the appended claims and equivalents thereof.

What the claims is:
1. An electronic device, comprising:
  a body having a first end and forming a non-closed ring shape;
  a first display assembly arranged in the body and having a first display output face being exposed through the first end of the body: and
  a second display assembly arranged in the body and having a second display output face being exposed through the second end of the body;
  wherein the first display assembly and the second display assembly have different display principles,
  wherein the second display assembly is an optical projection system, and the second display assembly comprises:

a display unit configured to display and output displayed contents in form of beam by projecting a first beam, and including a beam splitter unit and a display screen;

a conversion unit configured to process the first beam projected and outputted in form of beam to convert it into a second beam and output the second beam, and including a second collimation unit, a first collimation unit and a polarization beam splitter unit arranged between the first collimation unit and the second collimation unit; and a guide unit made from transparent material and configured to guide the second beam in the transparent material, and including a wave guide unit and a reflective unit;

and wherein the guide unit is exposed through the second end and has a first surface including the second display output face.

2. The electronic device as claimed in claim 1, wherein the body further comprises:

a second end, wherein the first end and the second end of the body meet a first predetermined position relation in which the first end faces the second end, or in which the first end crosses the second end, or in which the first end is substantially perpendicular to the second end.

3. The electronic device as claimed in claim 1, wherein the first display output face of the first display assembly and the second display output face of the second display assembly meet a second predetermined position relation in which the first display output face of the first display assembly faces the second display output face of the second display assembly, or in which the first display output face of the first display assembly crosses the second display output face of the second display assembly, or in which the first display output face of the first display assembly is substantially parallel to the second display output face of the second display assembly.

4. The electronic device as claimed in claim 1, wherein the guide unit further comprises a reflective unit, and wherein the reflective unit is arranged at a position corresponding to the second display output face of the second display assembly in the guide unit, wherein the reflective unit is configured to change the direction in which the second beam is guided in the transparent material to project the second beam towards the second display output face of the second display assembly.

5. The electronic device as claimed in claim 1, wherein the first end has a first portion extending a predetermined distance along the body and is perpendicular to a horizontal plane.

6. The electronic device as claimed in claim 1, wherein the body is provided with a processor therein, the processor being configured to control the first display assembly to display first display content continuously.

7. The electronic device as claimed in claim 6, wherein the body is further provided with a sensing unit configured to receive a triggering operation, and wherein the processor is further configured to analyze the triggering operation received by the sensing unit, and to perform a first instruction to control a second display assembly to display second display content when the triggering operation is analyzed to be associated with the first instruction.

8. The electronic device as claimed in claim 7, wherein a beam emitted from the second display assembly is incident into eyes of the user, when the eyes of the user become close to the second display output face of the second display assembly and view it, such that the user perceives a perceived picture, and wherein the perceived picture has display content which is the second display content, and the perceived picture has a size greater than that of the second display output face.

* * * * *